United States Patent
Seto

(10) Patent No.: US 10,831,414 B2
(45) Date of Patent: Nov. 10, 2020

(54) IMAGE FORMING APPARATUS, IMAGE FORMING SYSTEM, AND IMAGE FORMING METHOD FOR PRINTING A DATA FILE DETERMINED TO BE PRINTED

(71) Applicant: SHARP KABUSHIKI KAISHA, Sakai (JP)

(72) Inventor: Hideki Seto, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/563,217

(22) Filed: Sep. 6, 2019

(65) Prior Publication Data

US 2020/0097220 A1  Mar. 26, 2020

(30) Foreign Application Priority Data

Sep. 25, 2018 (JP) ................... 2018-179304

(51) Int. Cl.
*G06F 3/12* (2006.01)
*H04N 1/00* (2006.01)

(52) U.S. Cl.
CPC .......... *G06F 3/1204* (2013.01); *G06F 3/1208* (2013.01); *G06F 3/1254* (2013.01); *G06F 3/1256* (2013.01); *H04N 1/00395* (2013.01); *G06F 3/128* (2013.01)

(58) Field of Classification Search
None
See application file for complete search history.

(56) References Cited

U.S. PATENT DOCUMENTS

2008/0043281 A1* 2/2008 Kato ................ H04N 1/00175
358/1.15
2010/0205566 A1 8/2010 Matoba

FOREIGN PATENT DOCUMENTS

JP  2013-046179 A  3/2013
JP  5419486 B2  2/2014

* cited by examiner

*Primary Examiner* — Thomas D Lee
(74) *Attorney, Agent, or Firm* — ScienBiziP, P.C.

(57) ABSTRACT

An image forming apparatus including: an object-to-be-printed determiner that, when the number of data files stored in a storage is smaller than a set predetermined number, determines the data files as files to be printed: and an image forming portion that prints the determined files to be printed.

8 Claims, 16 Drawing Sheets

IMAGE FORMING APPARATUS, IMAGE FORMING SYSTEM, AND IMAGE FORMING METHOD FOR PRINTING A DATA FILE DETERMINED TO BE PRINTED

BACKGROUND OF THE INVENTION

Field of the Invention

The present invention relates to an image forming apparatus, an image forming system, and an image forming method for printing data files.

Description of the Background Art

An image forming apparatus that prints data files of image data, document data, etc., generally reads data files stored in a storage medium and displays the read data files on an operation screen, and prints a data file selected by a user on the operation screen. Also when reading a data file stored in a portable storage medium, such as a USB flash drive, and printing a data file, an image forming apparatus usually performs printing when a user checks a data file to be printed on an operation screen and selects a desired data file.

In contrast, a system that, when the number of data files to be printed by the image forming apparatus is large, displays data files as a list or as thumbnails so that a user can easily select and specify a data file to be printed is disclosed (see, for example, Japanese Unexamined Patent Application Publication No. 2013-46179).

However, when the number of data files stored in a storage medium, such as a portable storage medium, is small, or when the data file to be printed is obvious to a user and the user desires to print the file to be printed without checking the data file to be printed, it may be bothersome for the user to display the data file on the operation screen or to perform a selection operation of the data file.

The present invention has been made in view of the problem described above, and an object thereof is to provide an image forming apparatus, an image forming system, an image forming method, and an image forming program that are capable of easily printing a data file to be printed when the number of stored data files is small.

SUMMARY OF THE INVENTION

An image forming apparatus according to the present invention includes an object-to-be-printed determiner that determines a file to be printed among data files, and a printing portion that prints the determined file to be printed. When the number of the data files is smaller than a set predetermined number, the object-to-be-printed determiner determines the data files as the files to be printed.

An image forming system according to the present invention is an image forming system that determines a file to be printed among data files and prints the file to be printed, the system including: a communication terminal device including an object-to-be-printed determiner that determines the data file as the file to be printed when the number of the data files is smaller than a set predetermined number and a communication portion that transmits the file to be printed; and an image forming apparatus including a file acquirer that acquires the file to be printed transmitted from the communication terminal device, and a printing portion that prints the file to be printed acquired by the file acquirer.

An image forming method according to the present invention is an image forming method for printing a data file stored in a communication terminal by an image forming apparatus, the method including: when the number of data files stored in the communication terminal device is smaller than a set predetermined number, determining the data files as files to be printed; transmitting the files to be printed to the image forming apparatus; and acquiring, by the image forming apparatus, the files to be printed transmitted from the communication terminal device, and printing the files to be printed.

According to the image forming apparatus and the like of the present invention, when the number of stored data files is smaller than a predetermined number, the data files to be printed can be easily printed.

DESCRIPTION OF THE PREFERRED EMBODIMENTS

Hereinafter, embodiments of the present invention will be described with reference to the drawings. In the embodiments, as an example, a case in which an information processing apparatus is applied to an image forming apparatus as a multifunction device will be described. In a multifunction device, functions of a printer, a copier, a facsimile machine, etc. are integrated.

1. First Embodiment

First, a configuration of an image forming apparatus 1 according to an embodiment of the present invention will be described with reference to FIG. 1, FIG. 2, FIG. 3, FIG. 4, FIG. 5, and FIG. 6.

Figure 1:
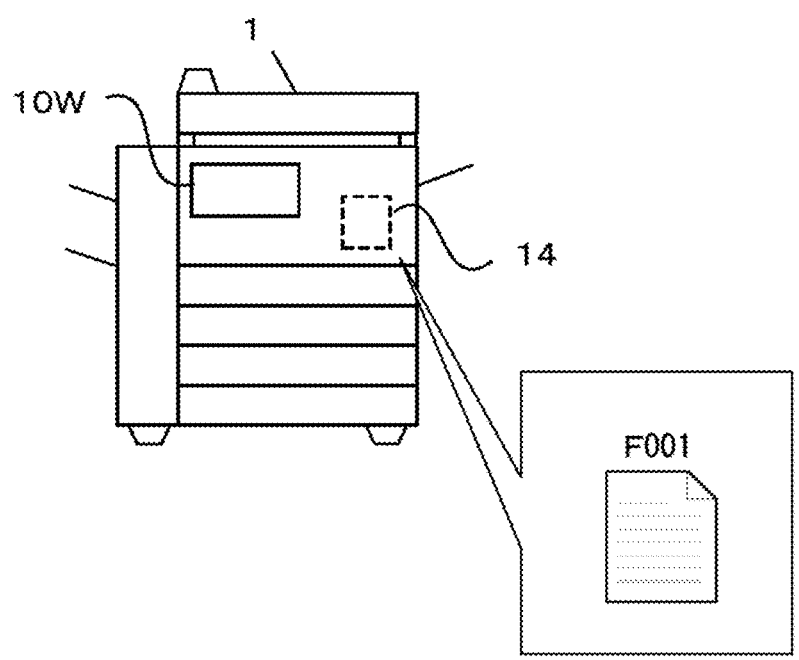
FIG. 1 is a schematic diagram of an image forming apparatus according to a first embodiment.

FIG. 1 is a schematic view of the image forming apparatus 1 according to a first embodiment of the present invention. The image forming apparatus 1 is a computer provided with a central processing unit (CPU) as a controller, and a storage medium, and having a communication function. The image forming apparatus 1 is, for example, a multifunction apparatus as a multifunction device in which functions of a printer, a copier, a facsimile machine, etc. are integrated. In FIG. 1, the image forming apparatus 1 includes a display screen portion 10W and a storage 14.

The image forming apparatus 1 includes the display screen portion 10W. The display screen portion 10W is constituted by, for example, a liquid crystal display or an organic electro luminescence (EL) display. For example, an operation screen (an operation interface screen) including operation keys with which a user performs operation input to the image forming apparatus 1 is displayed in the display screen portion 10W.

The storage 14 is provided inside the image forming apparatus 1 and includes a file storage area for storing data files. A data file (F001) is stored in the file storage area.

Figure 2:
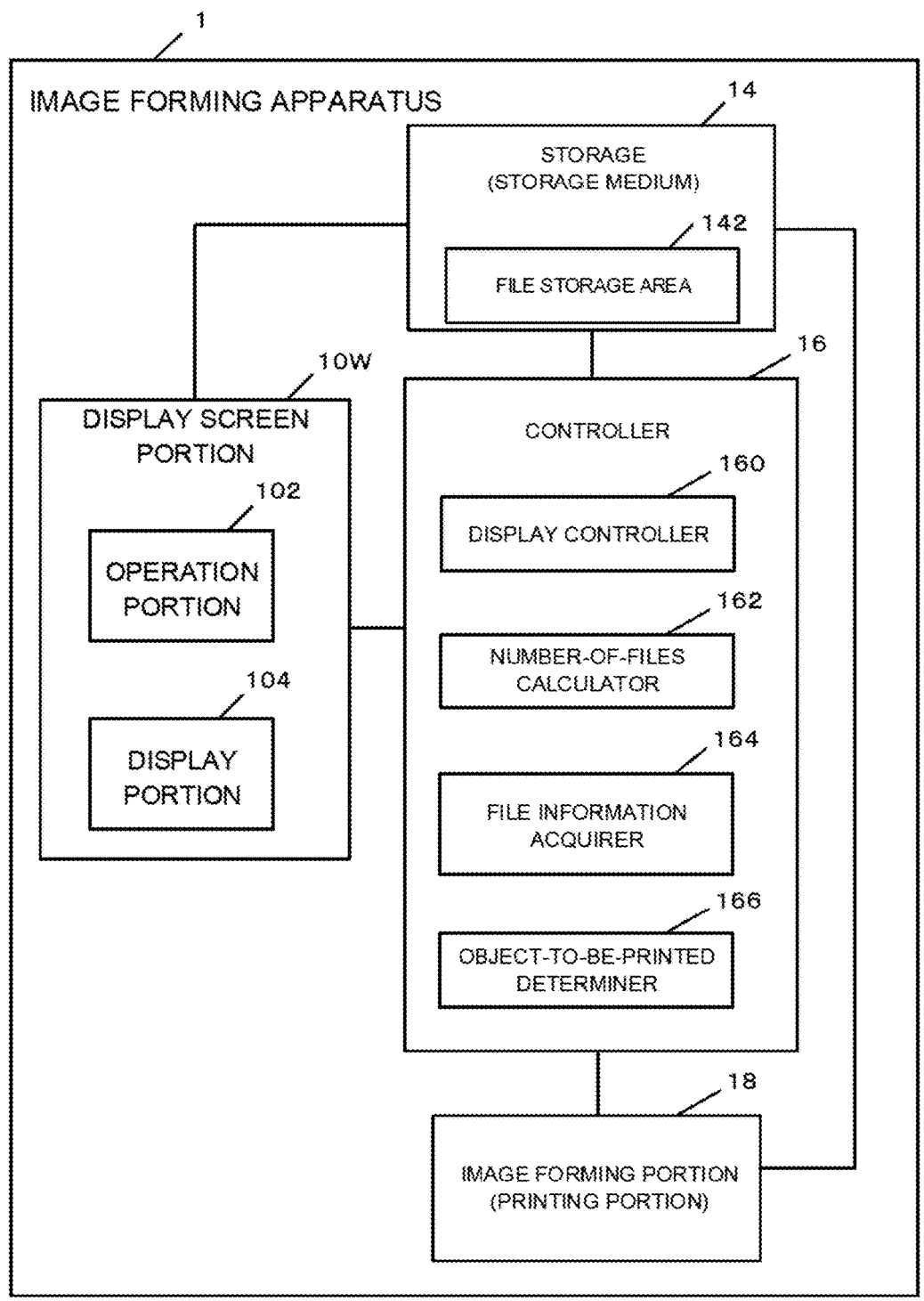
FIG. 2 is a functional block diagram of the image forming apparatus according to the first embodiment.

Subsequently, the image forming apparatus 1 will be described in detail with reference to a functional block diagram illustrated in FIG. 2. FIG. 2 is a functional block diagram of the image forming apparatus 1 according to the first embodiment. The image forming apparatus 1 includes the display screen portion 10W, the storage 14, a controller 16, and an image forming portion 18.

The display screen portion 10W includes an operation portion 102 and a display portion 104. The operation portion 102 is, for example, a touch panel that receives a key input operation, such as a touch operation, from a user. The display portion 104 is constituted by, for example, a liquid crystal display or an organic EL display. The key input in the display screen portion 10W is, for example, an input operation of text, numbers, symbols, and the like performed by the user, and a key selection operation on a software keyboard displayed in the display screen portion 10W. The operation portion 102 may be implemented by hardware keys or may be implemented in combination with software keys.

The storage 14 is a storage medium for storing data files, and includes, for example, a non-volatile storage device such as a solid state drive (SSD) or a hard disk drive (HDD) of which stored contents are not destroyed when turned off. Various programs are stored in the non-volatile storage device of the storage 14, and various functions of the image forming apparatus 1 are implemented by the controller 16 executing processes in accordance with these programs. The storage 14 also includes random access memory (RAM) that temporarily stores various types of data when the CPU executes a program.

The storage 14 includes a file storage area 142 for storing data files. The file storage area 142 stores, for example, data files transmitted from an apparatus connected to the image forming apparatus 1. The data files are, for example, a document file, image data, and moving image data generated by the user.

The controller 16 includes a CPU. The controller 16 executes various programs stored in the storage 14 to control the entire operation of the image forming apparatus 1, and integrally controls the execution of various jobs.

The controller 16 functions as a display controller 160, a number-of-files calculator 162, a file information acquirer 164, and an object-to-be-printed determiner 166 by reading out and executing programs.

The display controller 160 controls the display content displayed in the display portion 104 of the display screen portion 10W. Specifically, the display controller 160 causes the display portion 104 to display an operation screen including the data files stored in the storage 14.

For example, the display controller 160 may create thumbnails of the data files stored in the file storage area 142 and display the thumbnails in the display screen portion 10W (the display portion 104) in a selectable state.

Figure 3:
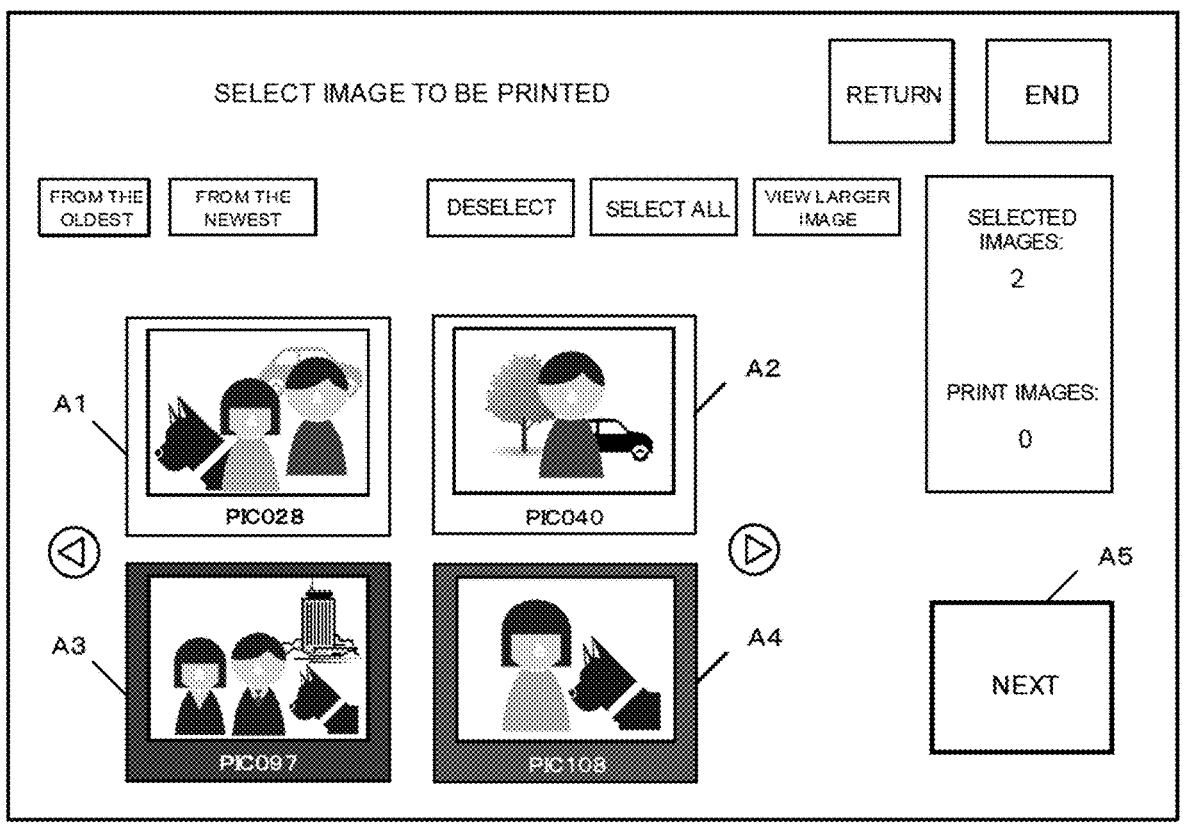
FIG. 3 is an explanatory diagram illustrating an example of an operation screen displayed on a display screen.

FIG. 3 is a diagram illustrating an example of the operation screen displayed in the display screen portion 10W. On the operation screen of FIG. 3, thumbnail images (A1, A2, A3, and A4) of the data files (image files) and various operation keys are included. The user can perform print settings, such as selection and cancellation of an object to be printed, by performing an input operation on the operation screen. FIG. 3 illustrates a state in which the thumbnail A3 and the thumbnail A4 are selected by the user. For example, when a "next" button A5, which is an operation key in FIG. 3, is tapped, two sheets of image files A3 and A4 displayed as thumbnails are printed.

The number-of-files calculator 162 calculates, by counting, the number of data files stored in the file storage area 142. It is assumed that the data files to be counted by the number-of-files calculator 162 are files to be printed in the image forming apparatus 1, and file format, attributes, etc. thereof are previously set. The file format of the data file that can be the file to be printed may be specified by the user.

The number-of-files calculator 162 may calculate the number of data files stored in the file storage area 142, may calculate, by counting, the number of data files stored in a set folder, or may calculate the number of data files having specified attributes.

The file information acquirer 164 acquires file information from the data files stored in the file storage area 142. The file information includes information indicating the date at which each data file stored in the file storage area 142 is generated, and information indicating attributes of the data file. Specifically, the file information acquirer 164 acquires, from each data file, information included in header information of each data file stored in the file storage area 142. The file information may include, for example, time at which the data file is generated, date and time at which the data file is edited, and location information associated with the location at which the data file is generated.

The object-to-be-printed determiner 166 determines a data file (hereinafter, "file") that becomes a file to be printed (hereinafter, "object to be printed") in accordance with the calculated number of files. The object-to-be-printed determiner 166 verifies whether the calculated number of files is smaller than a set predetermined number. For example, when the calculated number of files (for example, "3") is smaller than a predetermined number (for example, "5") and the number of files is one or greater, the object-to-be-printed determiner 166 determines all the files (here, all of the three files) are determined to be printed.

Also, based on the information related to the generation date of the file (hereinafter referred to as "generation date information") included in the file information acquired by the file information acquirer 164, the object-to-be-printed determiner 166 may determine data files generated after a predetermined date (for example, Apr. 1, 2018) as files to be printed.

Figure 4:
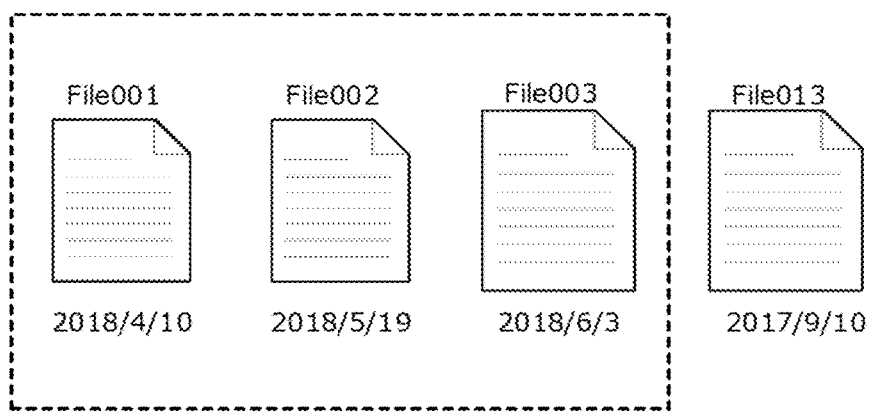
FIG. 4 is an explanatory diagram illustrating generation date information of data files.
Figure 4:
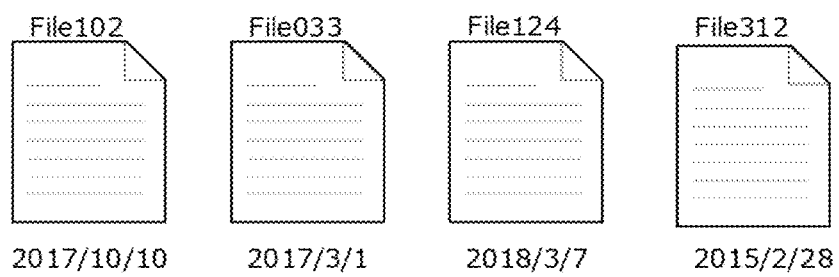

FIG. 4 is an explanatory diagram illustrating generation date information of each data file stored in the file storage area 142. For example, when the set date is Apr. 1, 2018, the object-to-be-printed determiner 166 determines data files to be printed based on the generation date information of each of the eight data files. In FIG. 4, three files (File 001, File 002, and File 003) generated after Apr. 1, 2018 are determined as the files to be printed.

When the calculated number of files is greater than the set predetermined number (the set number), the object-to-be-printed determiner 166 may determine the files as the files to be printed based on the generation date information of the files included in the file information.

Further, when the calculated number of files is smaller than the set predetermined number, the object-to-be-printed determiner 166 may determine the data files generated after a predetermined date as files to be printed based on the file information.

The image forming portion 18 implements a function of forming an image of a data file on a print sheet. The image forming portion 18 includes, for example, a photosensitive drum, a charging device, a laser unit, a developing device, a transfer separation device, a cleaning device, and a fixing device, and is configured as a laser printer that forms an image by an electrophotographic process.

The image forming portion 18 prints the file to be printed determined by the controller 16. For example, when all the files stored in the file storage area 142 are determined as files to be printed by the controller 16, the image forming portion 18 prints all the files read out of the file storage area 142.

When all the files stored in the file storage area 142 are determined as files to be printed, the display controller 160 does not necessarily have to display the files to be printed in the display screen portion 10W. In this case, when all the files stored in the file storage area 142 are determined as files to be printed, printing of the files to be printed is started immediately by the image forming portion 18.

With this configuration, the files to be printed are printed without a user performing an input operation, such as touching the "next" key on the operation screen for print setting, etc. Further, when all the files stored in the file storage area 142 are determined as files to be printed, the display controller 160 may display, in the display screen portion 10W, an operation screen indicating the number of data files determined as files to be printed.

Figure 5:
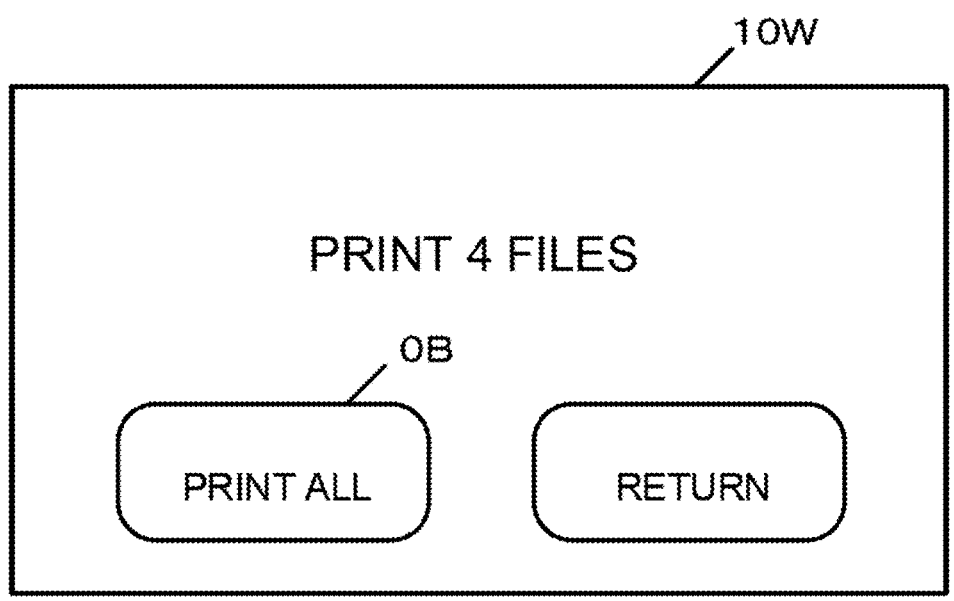
FIG. 5 is an explanatory diagram illustrating an example of an operation screen displaying the number of files to be printed.

For example, FIG. 5 is an explanatory diagram n illustrating an example of an operation screen displaying the number of files to be printed. The user checks the number (four) of the files to be printed in FIG. 5 and touches a "print all" button 0B, which is an operation key, to cause the image forming portion 18 to start printing four files to be printed.

Figure 6:
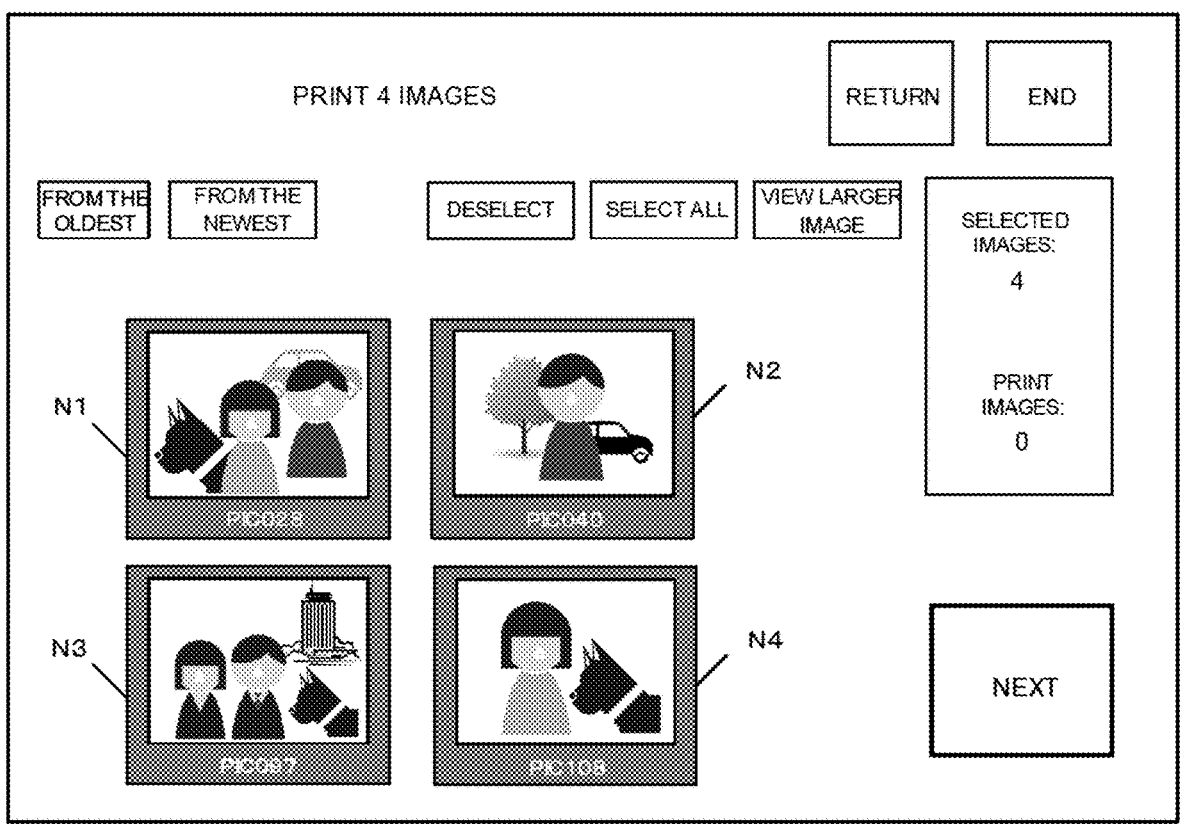
FIG. 6 is an explanatory diagram illustrating an example of an operation screen on which print setting is to be performed.

The display controller 160 may display, in the display screen portion 10W (the display portion 104), the object to be printed determined by the object-to-be-printed determiner 166 as being included in the operation screen on which a user performs print setting. FIG. 6 is an explanatory diagram illustrating an example of an operation screen on which print setting is to be performed.

In FIG. 6, thumbnail images (N1, N2, N3, and N4) of the files to be printed and operation buttons are included. Therefore, the user can cancel the printing of the data files when the data files displayed as thumbnails in the display screen portion 10W are not data files intended to be printed.

File Printing Operation Flow (1)

Figure 7:
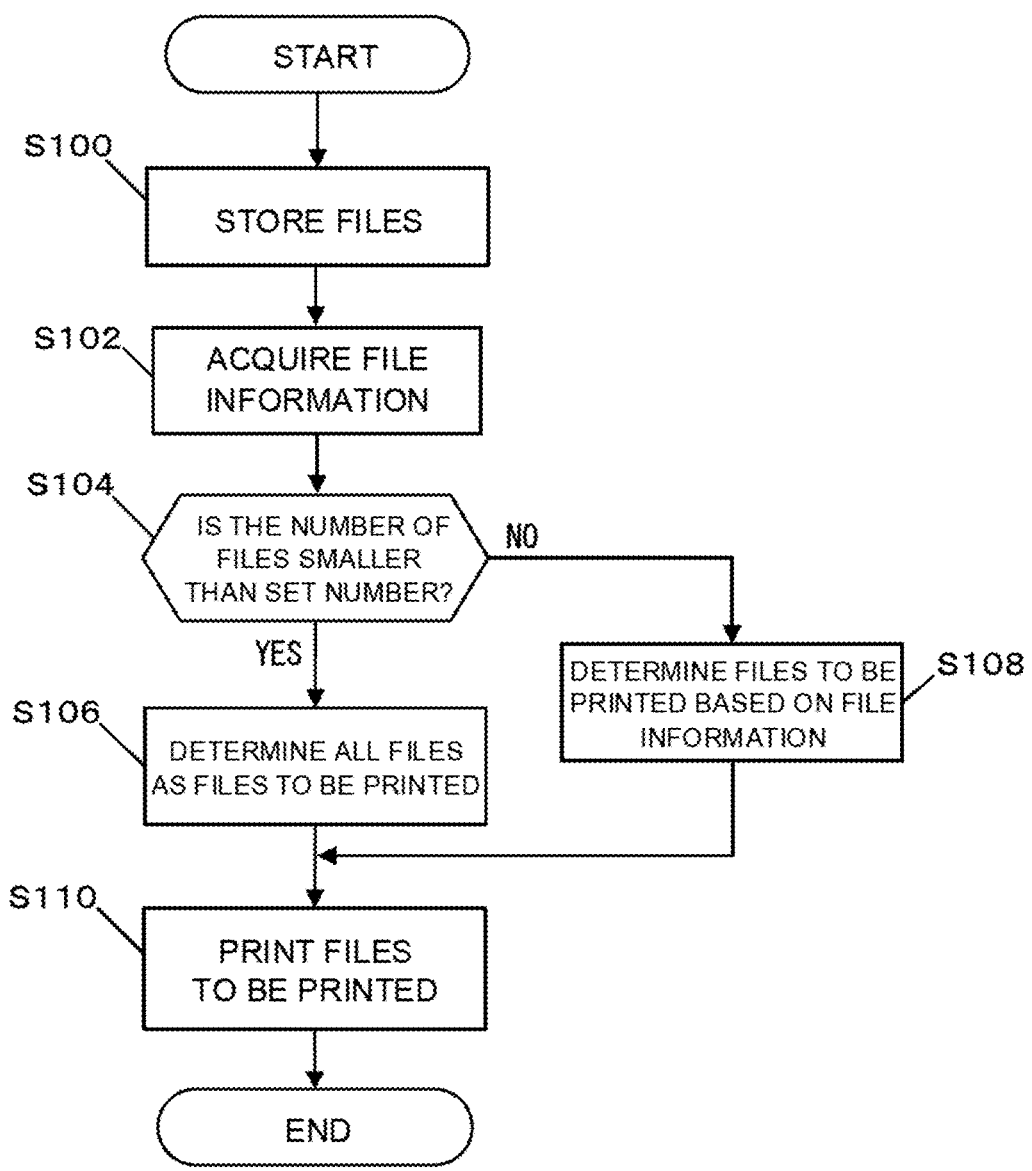
FIG. 7 is a flowchart illustrating a flow of a process until a file to be printed is printed in the image forming apparatus.

Subsequently, an operation flow of a printing operation in the image forming apparatus 1 will be described. FIG. 7 is a flowchart illustrating a flow of a process until an object to be printed is printed in the image forming apparatus 1 according to the first embodiment.

First, when the user stores files in the file storage area 142 of the image forming apparatus 1, and then the files are stored in the storage 14 (step S100).

Subsequently, the file information acquirer 164 acquires file information from the files stored in the file storage area 142 (step S102). Subsequently, the number-of-files calculator 162 calculates the number of files stored in the file storage area 142, and determines whether the calculated number of files is smaller than a set number (for example, "4") (step S104).

Here, when the number of files stored in the file storage area 142 is smaller than the set number (for example, the number of files stored in the file storage area 142 is one) (step S104: YES), the object-to-be-printed determiner 166 determines all the files stored in the file storage area 142, that is, one file as the object to be printed (step S106). Subsequently, the image forming portion 18 prints the object to be printed (step S110).

On the other hand, when the number of files stored in the file storage area 142 is equal to or larger than the set number in step S104 (for example, the number of files stored in the file storage area 142 is eight) (step S104: NO), the object-to-be-printed determiner 166 determines, as the files to be printed, files generated after Apr. 1, 2018 based on the file information acquired from the eight pieces of file data (step S108). Subsequently, the image forming portion 18 prints the files to be printed (step S110).

When the number of files generated after Apr. 1, 2018 is larger than a predetermined value (here, "4") in step S108, thumbnails of the files generated after Apr. 1, 2018 may be displayed, and the user may select an object to be printed. In this manner, an object to be printed may be determined.

Effect in First Embodiment

As described above, in the first embodiment, when the number of data files stored in the file storage area 142 is equal to or less than the set number, it is possible to print desired data files quickly and easily without the need for user's operation.

Second Embodiment

Subsequently, a second embodiment will be described. Hereinafter, portions different from the first embodiment will be described. Description of portions the same as those of the first embodiment will be omitted.

Figure 8:
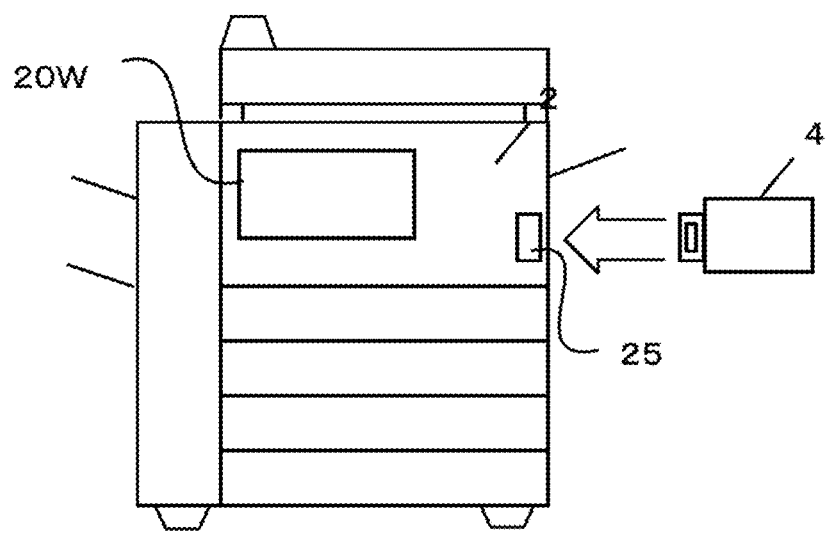
FIG. 8 is a schematic diagram of an image forming apparatus according to a second embodiment.

FIG. 8 is a schematic diagram of an image forming apparatus 2 according to the second embodiment. In FIG. 8, the image forming apparatus 2 includes a display screen portion 20W and a connection terminal portion 25. An external storage medium 4 is connected to the connection terminal portion 25.

The connection terminal portion 25 is an insertion slot into which a device corresponding to a USB interface, a memory card, etc., is inserted. The external storage medium 4 is a storage medium provided with a USB interface and including a file storage area inside. The external storage medium 4 is a USB flash drive or a secure digital (SD) card, for example.

Figure 9:
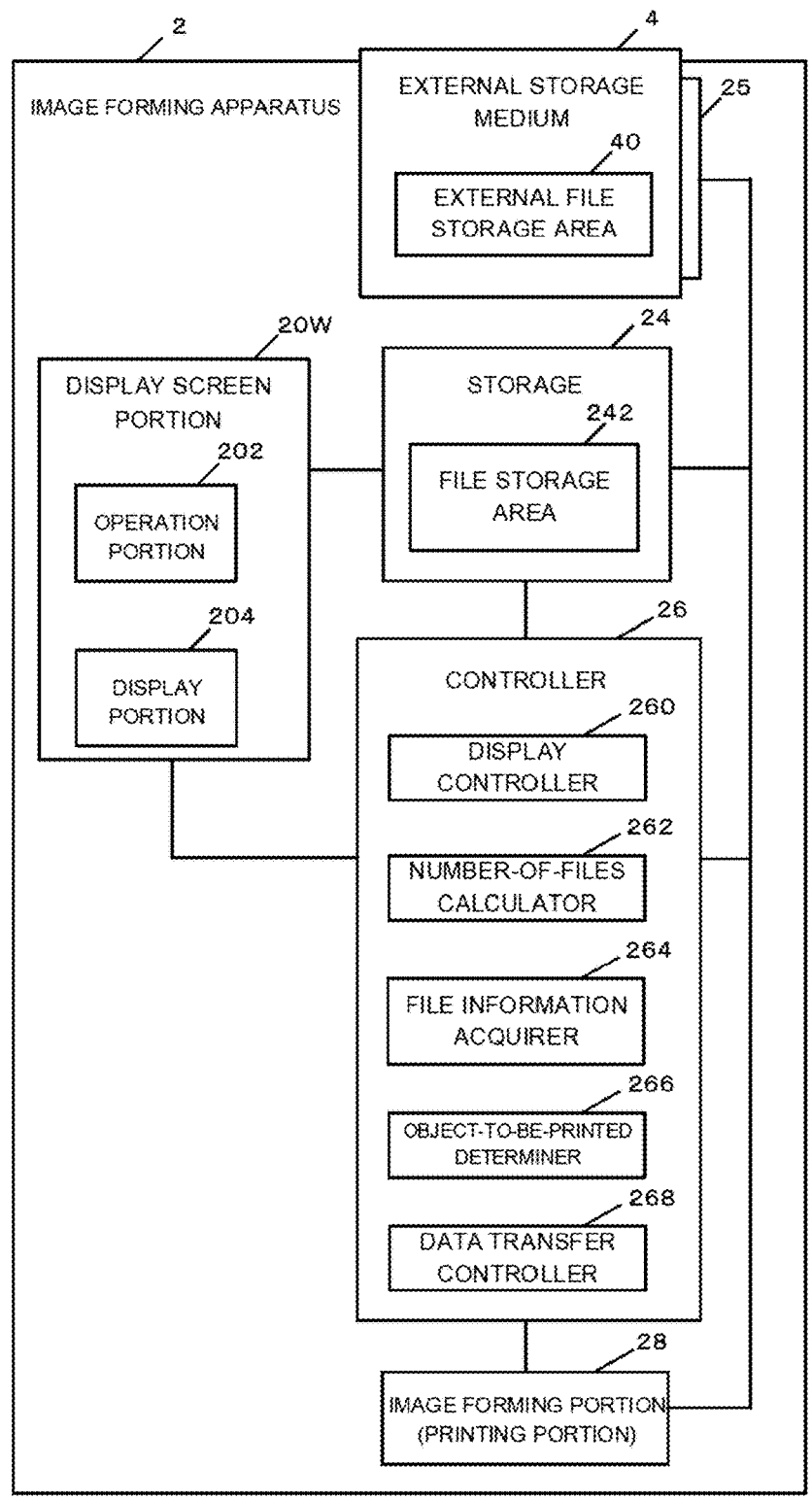
FIG. 9 is a functional block diagram of the image forming apparatus according to the second embodiment.

Subsequently, the image forming apparatus 2 will be described in detail with reference to a functional block diagram illustrated in FIG. 9. FIG. 9 is a functional block diagram of the image forming apparatus 2 according to the second embodiment. The image forming apparatus 2 includes the external storage medium 4, a display screen portion 20W, a storage 24, a controller 26, and an image forming portion 28 (corresponding to a printing portion).

The display screen portion 20W includes an operation portion 202 and a display portion 204. The operation portion 202 is, for example, a touch panel that receives a key input operation, such as touching, from a user. The display portion 204 is constituted by, for example, a liquid crystal display or an organic EL display. The key input in the display screen portion 20W is, for example, an input operation and a key selection operation of text, numbers, symbols, and the like performed by the user on the software keyboard displayed in the display screen portion 20W. The operation portion 202 may be implemented by hardware keys or may be implemented in combination with software keys.

The storage 24 is a storage medium for storing data files and includes, for example, a non-volatile storage device, such as an SSD or an HDD, of which storage contents are not destroyed when turned off. Various programs are stored in the non-volatile storage device of the storage 24, and various functions of the image forming apparatus 2 are implemented by the controller 26 executing processes in accordance with these programs. The storage 24 also includes RAM that temporarily stores various types of data when the CPU executes the programs.

The storage 24 includes a file storage area 242 for storing data files. For example, data files are transferred to the file storage area 242 from the external storage medium 4 connected to the connection terminal portion 25 of the image forming apparatus 2 in accordance with the user's operation and stored in the file storage area 242. The data files are, for example, a document file, image data, and moving image data generated by the user and stored the connection terminal portion 25.

The controller 26 includes a CPU, which is a controller, and executes various programs stored in the storage 24 to control the entire operation of the image forming apparatus 2, and integrally controls the execution of various jobs.

The controller 26 functions as a display controller 260, a number-of-files calculator 262, a file information acquirer 264 an object-to-be-printed determiner 266 and a data transfer controller 268 by reading out and executing the programs.

The display controller 260 controls the display content displayed in the display portion 204 of the display screen portion 20W. Specifically, the display controller 260 causes the display portion 204 to display an operation screen including the data files stored in the storage 24, key buttons used for selection, and the like. For example, the display controller 260 may create thumbnails of the data files stored in the file storage area 242 and display the thumbnails in the display screen portion 20W (the display portion 204) in a selectable state.

The number-of-files calculator 262 calculates, by counting, the number of data files stored in the file storage area 242.

It is assumed that the data files to be counted by the number-of-files calculator 262 are files to be printed in the image forming apparatus 2, and file format, attributes, etc. thereof are previously set. The file format of the data file that can be the file to be printed may be specified by the user.

The number-of-files calculator 262 may access an external file storage area 40 of the external storage medium 4 connected to the connection terminal portion 25 and calculate the number of data files stored in the external file storage area 40.

The number-of-files calculator 262 may calculate the number of data files stored in the file storage area 242 or the external file storage area 40, may calculate, by counting, the number of data files stored in a set folder, or may calculate the number of data files having specified attributes.

The file information acquirer 264 acquires file information including information indicating the date at which the data file stored in the file storage area 242 is generated (generation date information). Specifically, the file information acquirer 264 acquires header information and information indicating attributes from each data file stored in the file storage area 242. The file information may include, for example, time at which the data file is generated, and location information associated with the location at which the data file is generated.

The object-to-be-printed determiner 266 determines files to be printed in accordance with the number of files calculated by the number-of-files calculator 262. Specifically, when the number of data files stored in the file storage area 242 is smaller than a set number, the object-to-be-printed determiner 266 determines the data files as files to be printed. For example, when the calculated number of files is less than five and the number of files is one or greater, the object-to-be-printed determiner 266 determines all the files as objects to be printed.

Further, when the number of data files stored in the external storage medium 4 is smaller than the set number, the object-to-be-printed determiner 266 may determine the data files as files to be printed and acquire the data files from the external storage medium 4. In this case, the data files stored in the external storage medium 4 is read out of the external storage medium 4 and printed by the image forming portion 28.

When an apparatus connected to the connection terminal portion 25 includes a storage area, the data transfer controller 268 transfers the data files stored in the storage medium to the storage 24. The data transfer controller 268 accesses the external file storage area 40 of the external storage medium 4 connected to the connection terminal portion 25, for example, and transfers the data files stored in the external file storage area 40 to the storage 24.

Further, when a user requests data transfer via the operation portion 202, the data transfer controller 268 may transfer the data file stored in the external file storage area 40 to the file storage area 242.

When a storage medium storing the data file, such as the external storage medium 4, is connected to the connection terminal portion 25, the data transfer controller 268 may detect the connection and may start a transfer process of the data files stored in the external storage medium.

The image forming portion 28 prints the determined file to be printed in accordance with a command from the controller 26. The image forming portion 28 implements a function of forming an image of a data file on a print sheet. The image forming portion 28 includes, for example, a photosensitive drum, a charging device, a laser unit, a developing device, a transfer separation device, a cleaning device, and a fixing device, and is configured as a laser printer that forms an image by an electrophotographic process.

When, for example, the number of files stored in the file storage area 242 is smaller than a predetermined number (for example, "5"), all the files are set as files to be printed. Therefore, the image forming portion 28 may print all the files stored in the file storage area 242 without displaying a print setting screen in the display screen portion 20W.

In this case, printing of the files to be printed is performed without the user performing an input operation on the operation screen. For example, when the user knows the data file stored in the file storage area 242 of the storage 24 and desires to print the data file, the user can print the data file quickly without displaying the file to be printed in the display screen portion 20W or performing an operation to the display screen portion 20W.

File Printing Operation Flow (2)

Figure 10:
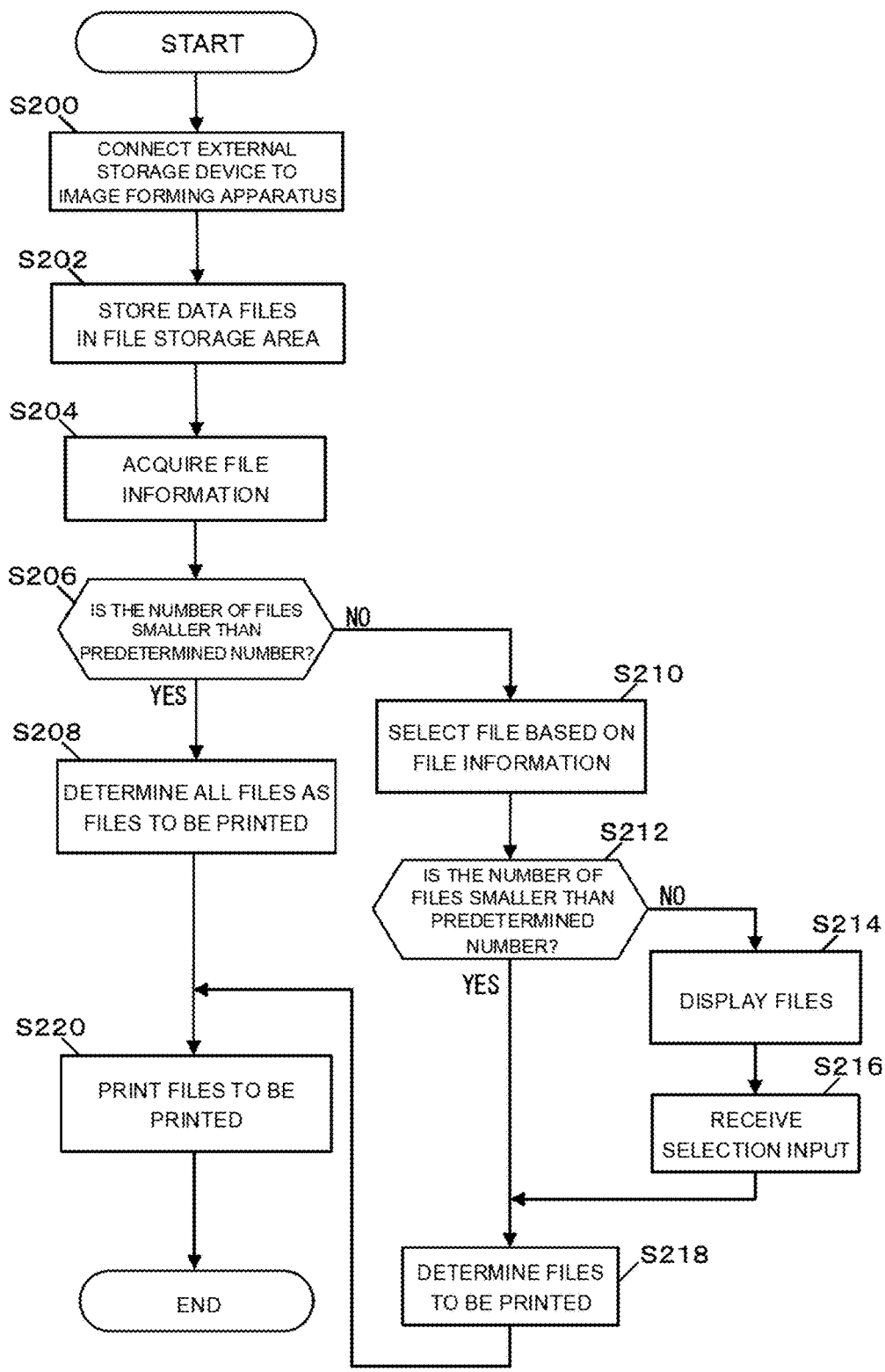
FIG. 10 is a flowchart illustrating a flow of a process until files to be printed are printed in the image forming apparatus.

Subsequently, an operation flow of a printing operation in the image forming apparatus 2 will be described. FIG. 10 is a flowchart illustrating a flow of a process until files to be printed are printed in the image forming apparatus 2 according to the second embodiment.

First, the external storage medium 4 is connected to the image forming apparatus 2 by the user (step S200). Subsequently, the data transfer controller 268 transfers the data files stored in the external file storage area 40 to the file storage area 242 and the data files are stored in the file storage area 242 (step S202).

Subsequently, the file information acquirer 264 acquires file information from the data files stored in the file storage area 242 (step S204). The number-of-files calculator 262 calculates the number of data files stored in the file storage area 242, and determines whether the calculated number of files is smaller than a set predetermined number (a set number: for example, "5") (step S206).

Here, when the number of files stored in the file storage area 242 is smaller than the set number (for example, the number of files stored in the file storage area 242 is three) (step S206: YES), the object-to-be-printed determiner 266 determines the three files stored in the file storage area 242 as the objects to be printed (step S208), and the image forming portion 18 prints the files to be printed (step S220).

Figure 11:
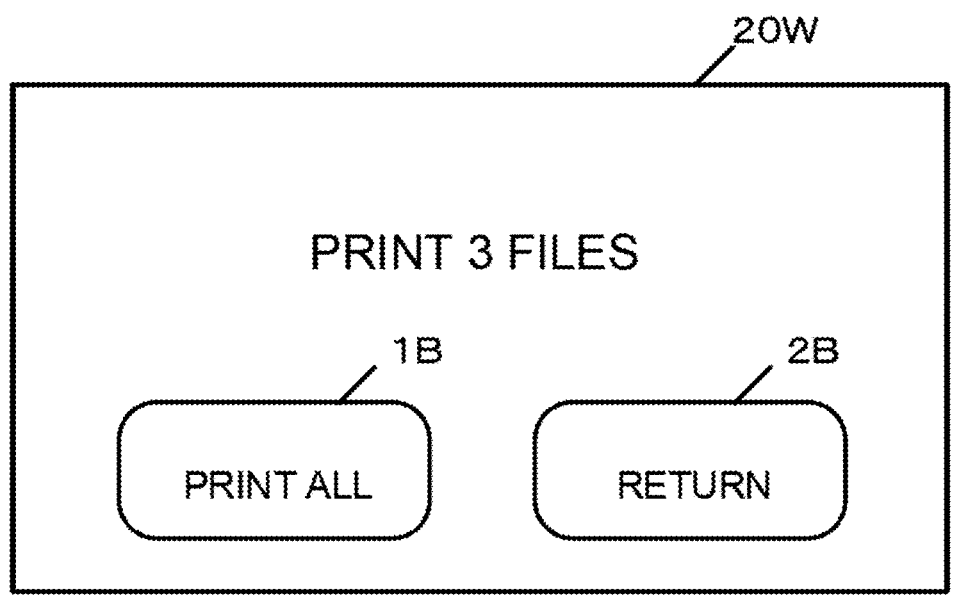
FIG. 11 is an explanatory diagram illustrating an example of an operation screen displayed on a display screen.

When the object to be printed is determined in step S208, for example, the display controller 260 may display, in the display screen portion 20W, an operation screen displaying the number of files to be printed (for example, three) as illustrated in FIG. 11. In FIG. 11, when the user performs touch operation on a "print all" button 1B on the operation screen, the image forming portion 18 prints the files to be printed. Further, in FIG. 11, when a touch operation is performed on a "back" button 2B, an operation screen on which data files to be printed are displayed in thumbnails may be displayed.

On the other hand, when the number of files stored the file storage area 242 is larger than a predetermined number in step S206 (step S206: NO), the object-to-be-printed determiner 266 selects the file to be printed based on the file information (step S210). For example, the object-to-be-printed determiner 266 selects a file of which generation date information of file information is Apr. 1, 2018 or later as an object to be printed.

Subsequently, the object-to-be-printed determiner 266 determines whether the number of the selected files is smaller than a set predetermined number (a set number: for example, "5") (step S212).

Here, when the number of the selected files is smaller than five (step S212: YES), the object-to-be-printed determiner 266 determines the selected files, that is, all the files of which generation date information is Apr. 1, 2018 or later as files to be printed (step S218).

On the other hand, when the number of selected files is 10 or more in step S212 (step S212: NO), the display controller 260 displays the selected files as thumbnails or as a list, and waits for the user to select a file (step S214).

Subsequently, after the user selects a file that the user desires to print, upon reception of the touch input (selection input) of an operation key (for example, a "next" button) for determining an object to be printed (step S216), the object-to-be-printed determiner 266 determines the selected file as a file to be printed (step S218), and the image forming portion 18 prints the object to be printed (step S220).

Effect in Second Embodiments

As described above, according to the second embodiment, the data files stored in the external storage medium 4, such as a USB flash drive, can be quickly and easily printed by the image forming apparatus without requiring any operation.

3. Third Embodiment

Subsequently, a third embodiment will be described. Hereinafter, portions different from the first and the second embodiments will be described. Description of portions the same as those of the first and the second embodiments will be omitted.

Figure 12:
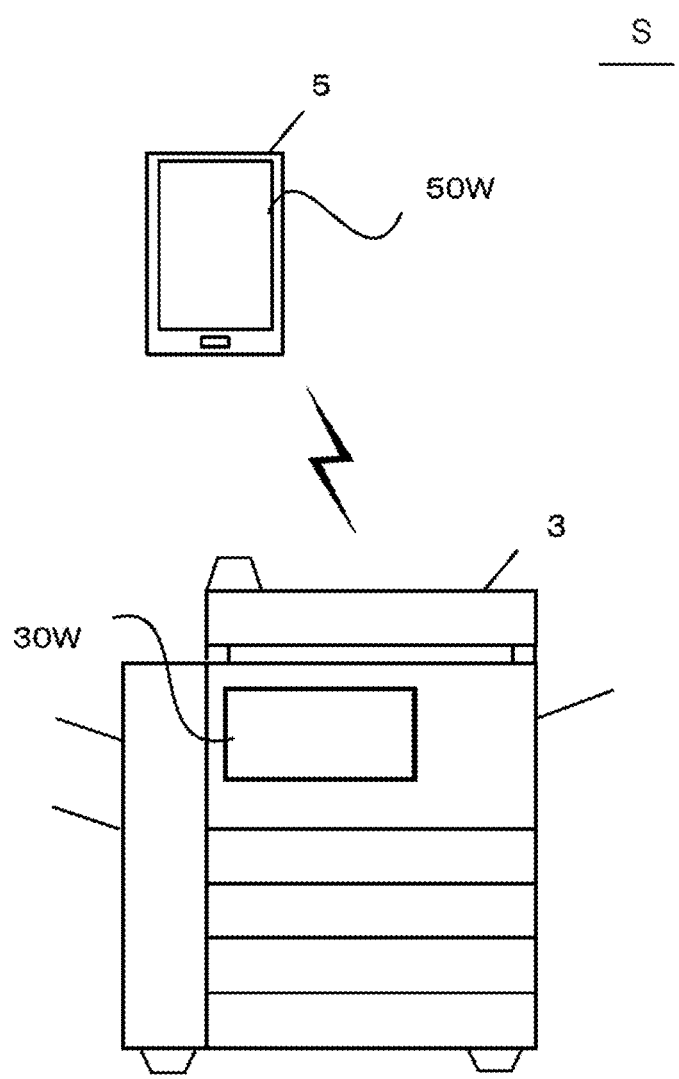
FIG. 12 is a diagram illustrating an outline of an image forming system according to a third embodiment.

FIG. 12 is a schematic view of an image forming system S according to the third embodiment of the present invention. The image forming system S of FIG. 12 includes an image forming apparatus 3 and a communication terminal device 5.

The communication terminal device 5 establishes a wireless communication connection with the image forming apparatus 3, and the image forming apparatus 3 acquires and prints a data file transmitted from the communication terminal device 5 via wireless communication. The wireless communication in the present embodiment may be, for example, Bluetooth (registered trademark), wireless LAN (Wi-Fi), infrared communication, and the like.

The communication terminal device 5 is a computer which includes a CPU as a controller and a data storage medium, and has a communication function. The communication terminal device 5 is a mobile terminal device, such as a smartphone, provided with a display screen portion 50W. The display screen portion 50W is constituted by, for example, a liquid crystal display or an organic EL display.

Further, a print application, for example, which is an application program for selecting and determining a file to be printed among data files stored in the storage area is introduced in the communication terminal device 5. In the display screen portion 50W, an operation screen including data files stored in the communication terminal device 5 and operation key is displayed as an operation screen of the print application.

Subsequently, the image forming apparatus 3 and the communication terminal device 5 in the image forming system S will be described in detail with reference to the functional block diagram illustrated in FIG. 13.

Figure 13:
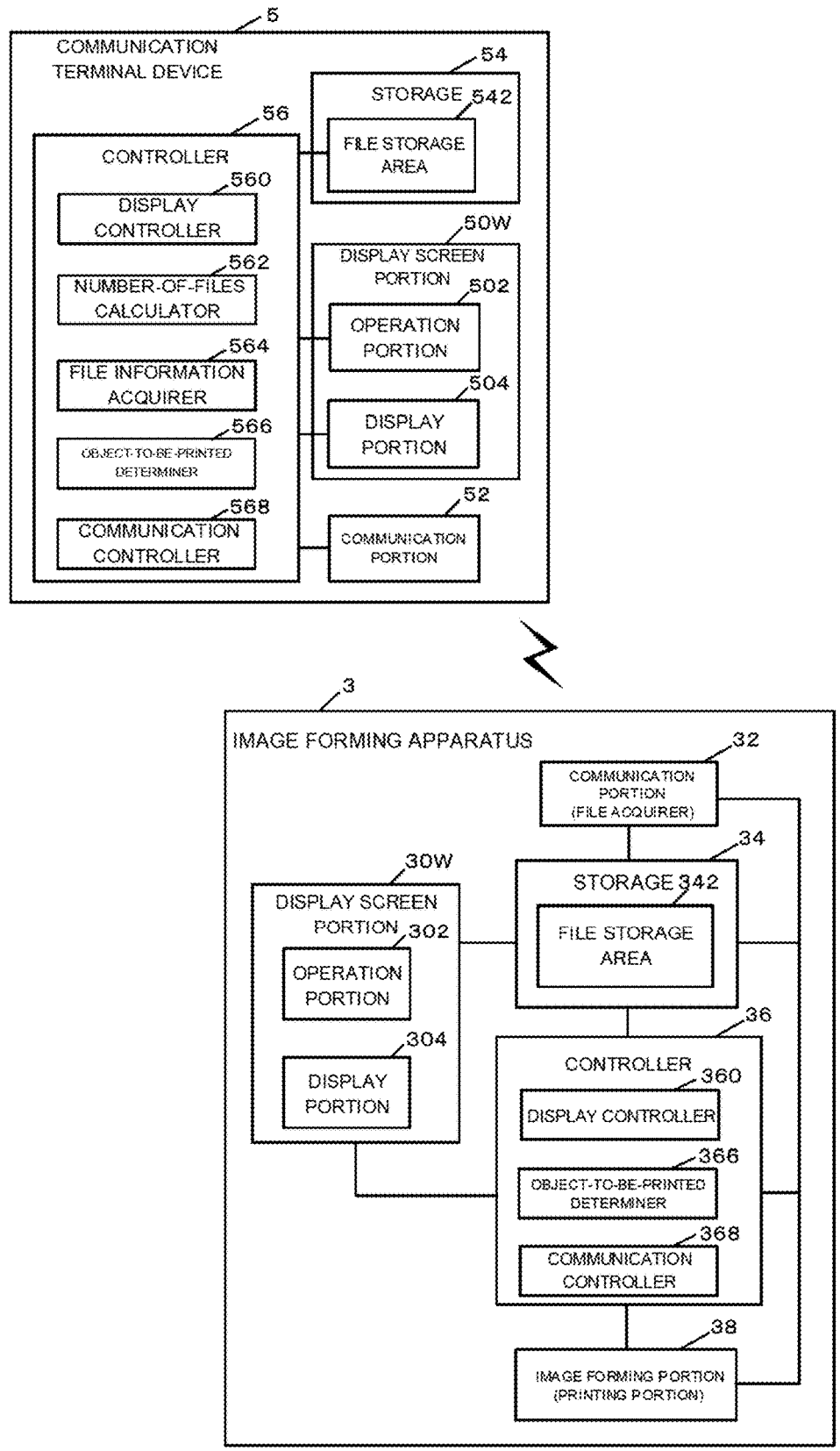
FIG. 13 is a functional block diagram of the image forming system according to the third embodiment.

FIG. 13 is a functional block diagram of the image forming system S according to the third embodiment. First, the communication terminal device 5 will be described. The communication terminal device 5 includes the display screen portion 50W, a communication portion 52, a storage 54, and a controller 56. Each of the configurations of these components will be described in detail below.

The display screen portion 50W includes an operation portion 502 and a display portion 504. The operation portion 502 is, for example, a touch panel that receives a key input operation, such as touching, from a user. The display portion 504 is constituted by, for example, a liquid crystal display or an organic EL display. The key input in the display screen portion 50W is, for example, an input operation of text, numbers, symbols, and the like performed by the user using a software keyboard displayed in the display portion 504.

The communication portion 52 is configured to include a communication antenna, and performs near field communication under the control of the controller 56. Specifically, the communication portion 32 establishes and performs near field communication with a Bluetooth-equipped device. The communication portion 32 establishes Bluetooth communication with, for example, the image forming apparatus 3 to perform wireless communication.

The storage 54 is a storage medium for storing data files and includes, for example, a non-volatile storage device, such as an SSD or an HDD, of which storage contents are not destroyed when turned off. A non-volatile storage device of the storage 54 also includes RAM that temporarily stores various types of data when the CPU executes the programs.

Various programs are stored in the storage 54, and various functions of the communication terminal device 5 are implemented by the controller 56 executing processes accordance with these programs. A print application, for example, is stored in the storage 54.

The storage 54 includes a file storage area 542 for storing data files. The data files include, for example, image files and moving image files obtained by capturing by the user using a camera function of the communication terminal device 5, and document files generated by the user.

The controller 56 includes a CPU. When the CPU executes various programs stored in the storage 54, the controller 56 controls the entire operation of the communication terminal device 5 and controls the execution of various jobs in an integrated manner.

The controller 56 includes a display controller 560, a number-of-files calculator 562, a file information acquirer 564, and an object-to-be-printed determiner 566. The display controller 560, the number-of-files calculator 562, the file information acquirer 564, the object-to-be-printed determiner 566, and the communication controller 568 of the present embodiment may be implemented as functions in the print application when the print application of the communication terminal device 5 is executed.

The display controller 560 controls the display content displayed in the display portion 504. Specifically, the display controller 560 controls to cause the display portion 504 to display the data files stored in the storage 54 and an operation screen. For example, the display controller 560 may create thumbnails or a list of the data files stored in the file storage area 542 and display the thumbnails or the list in the display screen portion 50W (the display portion 504) in a selectable state.

Figure 14:
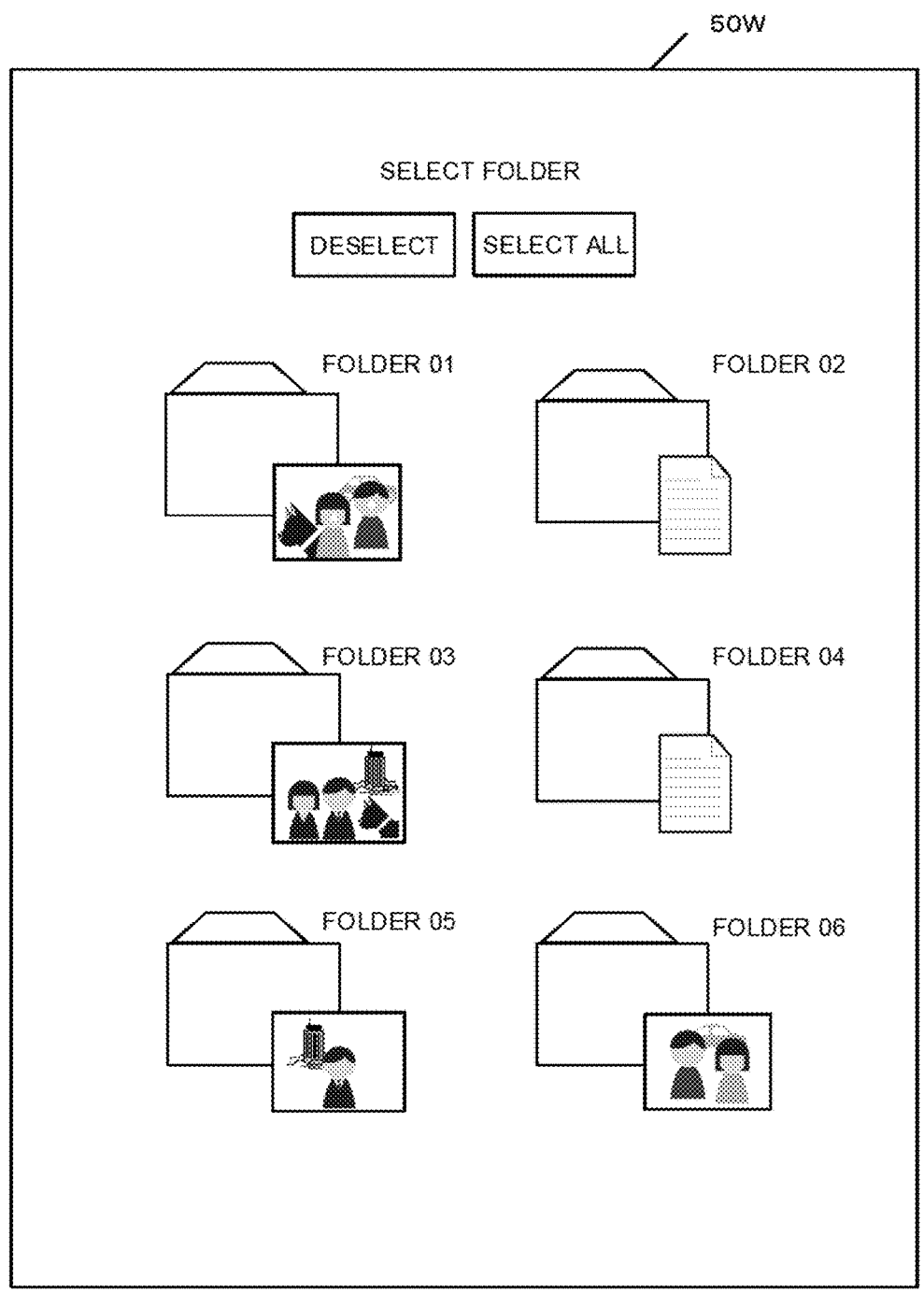
FIG. 14 is an explanatory diagram illustrating an example of an operation screen in a communication terminal device.

FIG. 14 is a diagram illustrating an example of the operation screen of the print application displayed in the display screen portion 50W. Data files are displayed in folder units (folder 01 to folder 06) on the operation screen of FIG. 14. The user can perform print setting, such as selection or cancellation of an object to e printed, by specifying a folder or a data file on the operation screen of the print application.

The number-of-files calculator 562 calculates, by counting, the number of data files stored in the file storage area 542. The data files counted by the number-of-files calculator 562 are data files that can be printed by the image forming apparatus 3, and file format, attributes, etc. of the data files are previously set. The file format of the data file may be specified by the user.

The number-of-files calculator 562 may calculate the number of data files stored in the file storage area 542, may calculate, by counting, the number of files included in the folder specified by the user in the print application, or may calculate the number of data files having an attribute designated by the user in the print application.

The file information acquirer 564 acquires file information including information indicating the date at which the data file stored in the file storage area 542 is generated. Specifically, the file information acquirer 564 acquires, from each data file, header information of each data file stored in the file storage area 542 and information indicating an attribute of the data file. The file information may include, for example, time at which the data file is generated, and location information associated with the location at which the data file is generated.

The object-to-be-printed determiner 566 determines the files to be printed in accordance with the calculated number of files. For example, when the calculated number of files is smaller than a predetermined number (for example, "5" and the number of files is one or more, the object-to-be-printed determiner 566 determines all the files as objects to be printed.

Also, based on the generation date information included in the file information acquired by the file information acquirer 564, the object-to-be-printed determiner 566 may determine the files generated after a set date (for example, Apr. 1, 2018) as files to be printed.

When the calculated number of files is larger than a predetermined number (for example, "10"), the object-to-be-printed determiner 566 may determine the data files generated after a set date for example, Apr. 1, 2018) as files to be printed based on the generation date information of the files included in the file information.

The communication controller 568 controls the operation of the communication portion 52 to implement wireless data communication between the communication terminal device 5 and an external communication device. For example, the communication controller 568 establishes wireless communication with the image forming apparatus 3 using Bluetooth via the communication portion 52. The communication controller 568 transmits the file determined as the object to be printed to the image forming apparatus 3 using the wireless communication.

Next, referring back to FIG. 13, the image forming apparatus 3 will be described. The image forming apparatus 3 includes a display screen portion 30W, a communication portion 32, a storage 34, a controller 36, and an image forming portion 38. Each of the configurations of these components will be described below.

The display screen portion 30W includes an operation portion 302 and a display portion 304. The operation portion 302 is, for example, a touch panel that receives a key input operation, such as touching, from a user. The display portion 304 is constituted by, for example, a liquid crystal display or an organic EL display. The key input from the user in the display screen portion 30W is, for example, an input operation of text, numbers, symbols and the like performed by the user using a software keyboard displayed in the display screen portion 30W. The operation portion 302 may be implemented by hardware keys or may be implemented in combination with software keys.

The communication portion 32 is configured to include a communication antenna, and performs near field communication under the control of the controller 36, Specifically, the communication portion 32 establishes and performs near field communication with a Bluetooth-equipped device. The communication portion 32 establishes Bluetooth communication with, for example, the communication portion 52 of the communication terminal device 5 to perform wireless communication.

The storage 34 is a storage medium for storing data files and includes, for example, a non-volatile storage device, such as an SSD or an HDD, of which storage contents are not destroyed when turned off. Various programs are stored in the non-volatile storage device of the storage 34, and various functions of the image forming apparatus 3 are implemented by the controller 36 executing processes in accordance with these programs. The storage 34 also includes RAM that temporarily stores various types of data when the CPU executes the programs.

The storage 34 includes a file storage area 342 for storing data files. The file storage area 342 stores, for example, data files transmitted from an apparatus wirelessly connected to the image forming apparatus 3. The data files are, for example, a document file, image data, and moving mage data generated by the user.

The controller 36 includes a CPU. The controller 36 executes various programs stored the storage 34 to control the entire operation of the image forming apparatus 3, and integrally controls the execution of various jobs.

The controller 36 functions as a display controller 360, an object-to-be-printed determiner 366, and a communication controller 368 by reading and executing programs.

The display controller 360 controls the display content displayed in the display portion 304 of the display screen portion 30W. Specifically, the display controller 360 causes the display portion 304 to display the data files stored in the storage 34 and an operation screen of the image forming apparatus 3. For example, the display controller 360 may create thumbnails of the data files stored in the file storage area 342 and display the thumbnails in the display screen portion 30W (the display portion 304) in a selectable state.

In addition, when the number of files stored in the file storage area 342 is larger than a predetermined number (for example, "10"), the display controller 360 may cause the display portion 304 to display these data files in a user selectable state. For example, when the number of data files stored in the file storage area 342 is 12 and the number of data files generated after Apr. 1, 2018 is four, the object-to-be-printed determiner 366 may reduce the number of the objects to be printed from 12 to four.

The object-to-be-printed determiner 366 determines a file to be printed among the files stored in the file storage area 342. When the files stored in the file storage area 342 are the files determined as objects to be printed by the controller 56 of the communication terminal device 5, the object-to-be-printed determiner 366 determines all the files stored in the file storage area 342 as the files to be printed.

In addition, for example, when the number of files stored in the file storage area 342 is smaller than a predetermined number (for example, "5") and the number of files is one or greater, that is, when the number of files stored is any of one to four, the object-to-be-printed determiner 366 may determine all the files as the objects to be printed.

The communication controller 368 controls the operation of the communication portion 32 to establish data communication between the image forming apparatus 3 and an external communication device, and controls data communication with the image forming apparatus 3 in the communication portion 32. For example, the communication controller 368 establishes Bluetooth communication connection with the communication terminal device 5 via the communication portion 32. Also, for example, the communication controller 368 controls so that the file transmitted from the communication terminal device 5 and received by the communication portion 32 (corresponding to the file acquirer) is stored in the file storage area 342.

The image forming portion 38 prints the determined file to be printed in accordance with a command from the controller 36. Specifically, the image of the file to be printed is formed on a print sheet. The image forming portion 38 in the present embodiment also includes, as in the image forming portion 18 of the first embodiment and the image forming portion 28 of the second embodiment, a photosensitive drum, a charging device, a laser unit, a developing device, a transfer separation device, a cleaning device, and a fixing device, and is configured as a laser printer that forms an image by an electrophotographic process.

When, for example, the number of files stored in the file storage area 342 is smaller than a predetermined number (for example, "5"), all the files are set as files to be printed. The image forming portion 38 may perform printing without displaying a print setting screen of the files to be printed.

File Printing Operation Flow (3)

Figure 15:
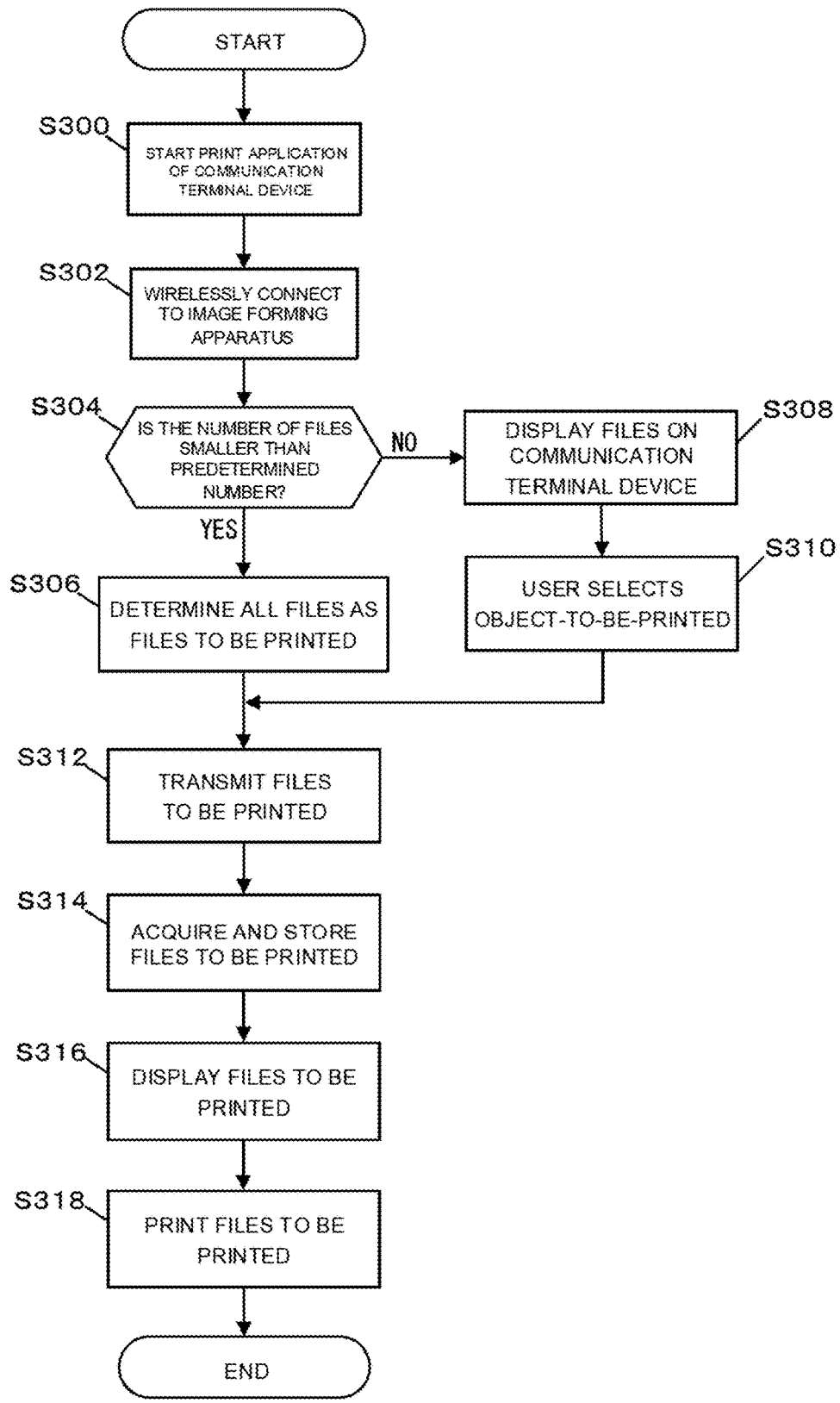
FIG. 15 is a flowchart illustrating a flow of a process for printing an object to be printed in the image forming system according to the third embodiment.

Subsequently, an operation flow of a process until an object to be printed is printed in the image forming system S according to the present embodiment will be described with reference to FIG. 15. FIG. 15 is a flowchart illustrating a flow of a process until an object to be printed is printed in the image forming system S according to the third embodiment.

First, the print application of the communication terminal device 5 is activated by a user's operation (step S300). Subsequently, the communication controller 568 establishes wireless communication connection with the image forming apparatus 3 as a function in the print application (step S302).

Subsequently, the number-of-files calculator 562 calculates the number of files stored in the file storage area 542, and determines whether the number of stored files is smaller than a set predetermined number (for example, a reference number "10") (step S304).

Here, for example, when the calculated number of files is eight (step S304: YES), the object-to-be-printed determiner 566 determines all the eight files stored in the file storage area 542 as files to be printed (step S306), and the communication portion 52 transmits these eight files to be printed to the image forming apparatus 3 (step S312).

On the other hand, when the calculated number of files is, for example, 12 in step S304, the display controller 560 of the communication terminal device 5 displays 12 data files in the display portion 504 as thumbnails (step S308).

Figure 16:
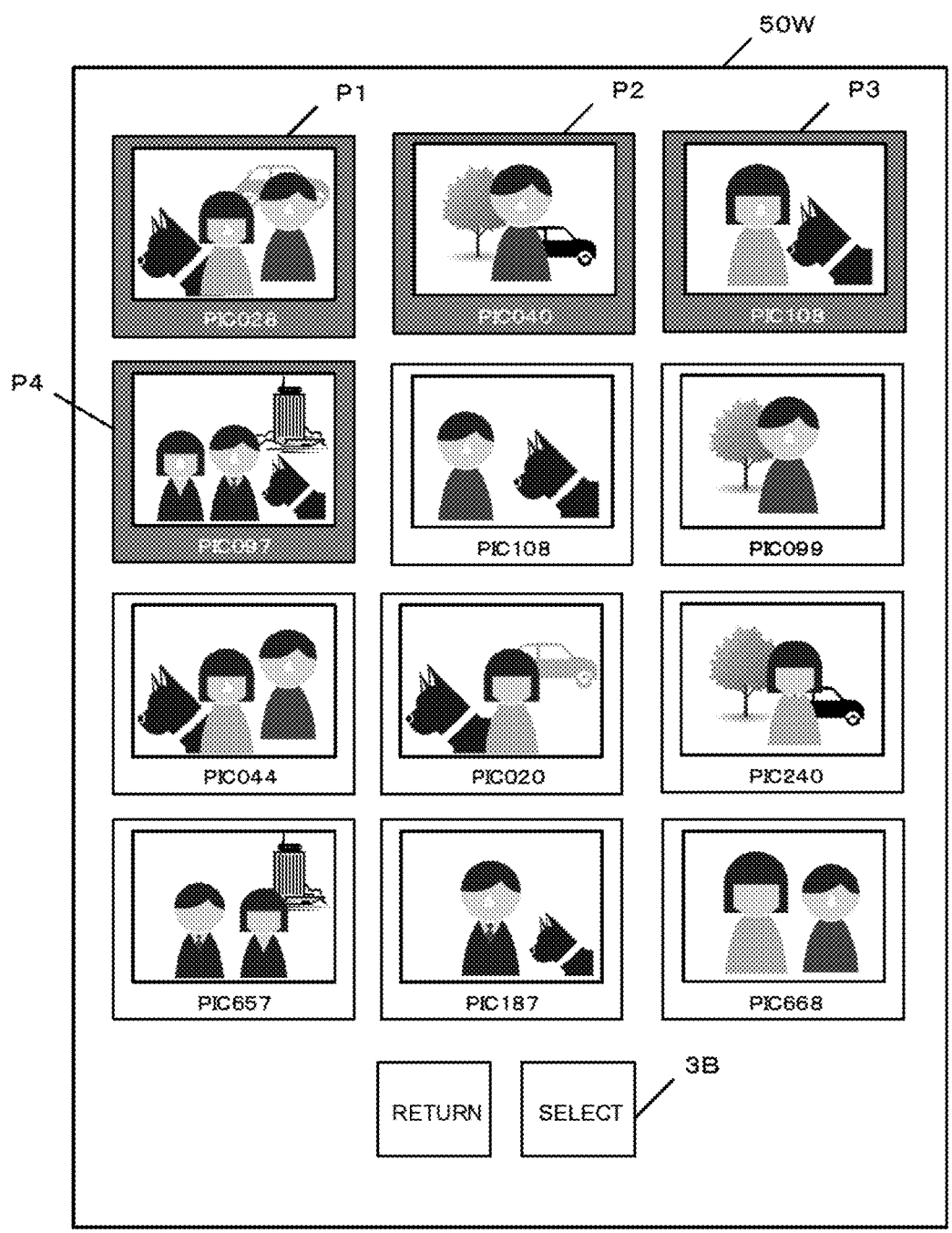
FIG. 16 is an explanatory diagram illustrating an example of an operation screen in the communication terminal device.

FIG. 16 is an example of the operation screen of the print application in the communication terminal device 5. The operation screen of FIG. 16 includes 12 thumbnail images for selection corresponding to the number of the calculated data files and various operation keys. The user may operate the thumbnail image to perform print settings, such as selection or cancellation of the objects to be printed.

Here, the user of the communication terminal device 5 performs selection input on, for example, the thumbnail images (step S310), the object-to-be-printed determiner 566 determines the data files corresponding to the selected thumbnail images as the files to be printed (step S310), and the communication portion 52 transmits the files to be printed to the image forming apparatus 3 (step S312).

For example, FIG. 16 illustrates a state in which four thumbnail images (P1, P2, P3, and P4) are selected by the user. Here, when the user touches a "select" button 3B, which is an operation key in FIG. 16, four data files (image files) corresponding to the thumbnail images P1 to P4 are transmitted to the image forming apparatus 3.

Subsequently, the communication portion 32 of the image forming apparatus 3 acquires the files to be printed and stores the files in the file storage area 342 (step S314). Subsequently, the display controller 360 displays the files to be printed stored in the file storage area 342 in the display portion 304 (step S316).

Here, when the user performs a selection operation on the file displayed in the operation portion 302, the object-to-be-printed determiner 366 prints the selected file (step S318).

If a certain time (for example, five seconds) has elapsed in a state in which the files to be printed are displayed in the display portion 304 in step S316, the image forming portion 38 may print the displayed files to be printed without waiting for a selection operation by the user.

In this case, after checking the files to be printed displayed in the display portion 304, the user can print the files to be printed without performing the operation on the operation screen.

Further, the image forming portion 38 may print the files to be printed when the files are stored in the file storage area 342 in step S314. In this case, the user can print quickly without waiting for the files to be printed to be displayed in the display portion 304.

Effect in Third Embodiment

That is, according to the third embodiment, the file to be printed determined by the print application of the communication terminal device 5 can be transmitted to the image forming apparatus 3 and printed quickly. Therefore, when for example, it is obvious for a user that the data file stored in the communication terminal device 5 is a file that, the user desires to print, the desired file can be easily printed without displaying on the image forming apparatus 3.

4. Modification

While in the foregoing embodiments of the present invention have been described in detail with reference to the drawings, specific configurations are not limited to the same and various changes without departing from the scope of the present invention fall within the claims of the invention.

Further, the program that operates in each device in the embodiments is a program (a program that causes a computer to function) that controls an arithmetic device, such as a CPU, to implement the functions of the embodiment described above. The information handled in these devices is temporarily accumulated in a temporary storage device (for example, RAM) at the time of processing, and then stored in storage devices of various types of ROM, HDD, and SSD. The information is read out and written in by the CPU as needed.

When the program is to be distribution in the market, the program may be stored and distributed in portable recording media, or may be transferred to a server computer connected via a network, such as the Internet. In this case, the storage device of the server computer is also included in the present invention.

What is claimed is:

1. An image forming apparatus, comprising:
an object-to-be-printed determiner that determines a file to be printed among data files;
a printing portion that prints the determined file to be printed; and
a file information acquirer that acquires file information including information about a date at which the data file is generated;
wherein
when a number of the data files is smaller than a set predetermined number, the object-to-be-printed determiner determines all of the data files as the files to be printed, and
when the number of the data files is larger than the predetermined number, the object-to-be-printed determiner determines another data file generated after a date set based on the file information as the file to be printed.

2. The image forming apparatus according to claim 1, wherein
when the number of the data files is larger than the predetermined number and when the number of the data files which generated after the date set based on the file information is smaller than the predetermined number,
the object-to-be-printed determiner determines, as the file to be printed, the data file generated after the date set based on the file information.

3. The image forming apparatus according to claim 1, further comprising
a display controller that, when the number of data files generated after a date set among the data files is greater than the predetermined number, displays the data file in a selectable state, wherein
the object-to-be-printed determiner determines, as the file to be printed, the selected data file among the data files.

4. The image forming apparatus according to claim 1, wherein: an external storage medium is connectable to the image forming apparatus; and
when the number of the data files stored in the external storage medium is smaller than the predetermined number, the object-to-be-printed determiner acquires the data files as the files to be printed.

5. An image forming system that determines a file to be printed among data files and prints the file to be printed, the system comprising:
a communication terminal device including an object-to-be-printed determiner that determines the data files as the files to be printed, a communication portion that transmits the files to be printed, and a file information acquirer that acquires file information including information about a date at which the data file is generated; and
an image forming apparatus including a file acquirer that acquires the files to be printed transmitted from the communication terminal device, and a printing portion that prints the files to be printed acquired by the file acquirer, wherein
when a number of the data files is smaller than a set predetermined number, the object-to-be-printed determiner determines all of the data files as the files to be printed, and
when the number of the data files is larger than the predetermined number, the object-to-be-printed determiner determines another data file generated after a date set based on the file information as the file to be printed.

6. The image forming system according to claim 5, wherein:
when the number of the data files is larger than the predetermined number and when the number of the data files which generated after the date set based on the file information is smaller than the predetermined number,
the object-to-be-printed determiner determines, as the file to be printed, the data file generated after the date set based on the file information.

7. The image forming system according to claim 5, wherein:
the communication terminal device includes
a display controller that, when the number of data files generated after the date set among the data files is greater than the predetermined number, displays the data file in a selectable state; and
the object-to-be-printed determiner determines the selected data file as the file to be printed.

8. An image forming method for printing a data file among data files stored in a communication terminal device by an image forming apparatus, the method comprising:
acquiring file information including information about a date at which the data file is generated,
determining the data files as files to be printed;
transmitting the files to be printed to the image forming apparatus; and
acquiring the files to be printed transmitted from the communication terminal device, and printing the files to be printed, wherein
when a number of the data files is smaller than a set predetermined number, all of the data files are determined as the files to be printed,
when the number of the data files is larger than the predetermined number, another data file generated after a date set based on the file information is determined as a file to be printed.

* * * * *